(12) United States Patent
Tzeng

(10) Patent No.: US 11,035,108 B2
(45) Date of Patent: Jun. 15, 2021

(54) FAUCET DEVICE

(71) Applicant: NCIP INC., Taipei (TW)

(72) Inventor: Rong-Chyan Tzeng, Taipei (TW)

(73) Assignee: NCIP INC., Taipei (TW)

( * ) Notice: Subject to any disclaimer, the term of this patent is extended or adjusted under 35 U.S.C. 154(b) by 62 days.

(21) Appl. No.: 16/596,234

(22) Filed: Oct. 8, 2019

(65) Prior Publication Data

US 2021/0102360 A1 Apr. 8, 2021

(51) Int. Cl.
*E03C 1/04* (2006.01)
*F16K 11/00* (2006.01)

(52) U.S. Cl.
CPC .......... *E03C 1/0404* (2013.01); *F16K 19/006* (2013.01)

(58) Field of Classification Search
CPC .............................. E03C 1/0404; F16K 19/006
USPC ........................................... 137/801; 251/368
See application file for complete search history.

(56) References Cited

U.S. PATENT DOCUMENTS

| 4,103,709 | A | * | 8/1978 | Fischer | ................. | F16K 11/078 |
| | | | | | | 137/615 |
| 4,979,539 | A | * | 12/1990 | Rohr | ..................... | E03C 1/0403 |
| | | | | | | 137/454.6 |
| 5,937,892 | A | * | 8/1999 | Meisner | .................... | E03C 1/04 |
| | | | | | | 137/375 |
| 2014/0251452 | A1 | * | 9/2014 | Schurle | ................. | F16K 27/044 |
| | | | | | | 137/315.12 |

* cited by examiner

*Primary Examiner* — John Bastianelli
(74) *Attorney, Agent, or Firm* — WPAT, PC

(57) ABSTRACT

A faucet device includes a body, a water temperature regulating valve, a water flow guide, a control rod, an outlet hose and a positioning seat. The regulating valve and the flow guide are disposed in the body. The flow guide is disposed at a lower end of the regulating valve. The outlet hose is concealed in the outlet pipe of the body. The inner end of the outlet hose is fixed with a metal joint and the outer end is a water outlet. The metal joint is inserted into the outlet passage of the flow guide. The positioning seat has an external thread and a protruding shaft and is screwed into the screw hole of the outlet passage of the outlet pipe, and the protruding shaft is inserted into the outlet end of the water outlet of the outlet hose to fix a position of the water outlet.

4 Claims, 6 Drawing Sheets

FAUCET DEVICE

FIELD OF THE INVENTION

The present invention relates to a faucet device, and more particularly to an installation and positioning structure of an outlet pipe and an assembly and positioning structure of a bubbler, so that the installation is more convenient and reliable.

BACKGROUND OF THE INVENTION

FIG. 1 shows the structure of a conventional faucet device. The faucet device comprises: a body 10, a water temperature regulating valve 11, a water flow guide 12, a control rod 13, an outlet tube 14, and an outlet hose 15. The outlet hose 15 is concealed within the outlet pipe 101 of the body 10. The inner end of the outlet hose 15 is connected to the outlet tube 14. While the outlet tube 14 is fixed in the body 10, an inner end joint 151 of the outlet hose 15 is pressed by a flange 102 provided in the body 10 to prevent the inner end of the outlet hose 15 from coming out. The installation of the outlet hose 15 is too complicated.

An outlet end 152 can be connected to one end of the outlet hose 15. The outlet end 152 can be screwed with a bubbler 153. The bubbler 153 blocks impurity particles in the water. Therefore, the bubbler 153 is often removed for cleaning. Frequently removing and installing the bubbler 153 is easy to cause damage to the thread, so that the bubbler 153 could be screwed to the outlet end 152 without reciprocal matching, and the angle of the bubbler 153 is shifted.

The water flow guide 12 is provided at a lower end of the water temperature regulating valve 11. A cold water pipe 16 and a hot water pipe (not shown, blocked by the cold water pipe 16) are introduced into the water temperature regulating valve 11 via the water flow guide 12. The warm water flowing out of the water temperature regulating valve 11 can flow out from the water flow guide 12, and flows out through the outlet tube 14 and the outlet hose 15. When the water temperature regulating valve 11 is damaged and water leakage occurs, the leaked water flows downward and drips to the floor.

SUMMARY OF THE INVENTION

The main purpose of the present invention is to provide a faucet device in which an outlet hose is disposed, and the outlet hose is easy to assemble and replace.

The second object of the present invention is to provide a faucet device which is provided with a leakage proof ring between a water flow guide and the inner wall of a body, and water droplets do not fall down on the floor when water leakage occurs above the water flow guide.

A further object of the present invention is to provide a faucet device in which a bubbler assembled is externally threaded and does not angularly deflect.

The faucet device provided in the present invention comprises: a body, a water temperature regulating valve, a water flow guide, a control rod, an outlet hose and a positioning seat. The water temperature regulating valve and the water flow guide are disposed in the body. The water flow guide is disposed at a lower end of the water temperature regulating valve. The water flowing out of the water temperature regulating valve can flow out from a second outlet passage of the water flow guide. The body is provided with an outlet pipe, and a first outlet passage is disposed below the outlet pipe. The outlet hose is concealed in the outlet pipe of the body.

The inner end of the outlet hose is fixed with a metal joint and the outer end is a water outlet. A leakage proof ring is embedded in the outer wall of the inner end of the metal joint. The metal joint is provided with a neck portion whose outer diameter is tapered from the inside to the outside. The neck portion is located outside the leakage proof ring. The metal joint can be inserted into the second outlet passage of the water flow guide. The wall of the second outlet passage is provided with a radially extending screw hole. A screw is screwed into the screw hole and urges the neck portion of the metal joint to fix the metal joint. The water outlet is provided with an outlet end. The first outlet passage of the outlet pipe of the body is a two-stage screw hole, and the diameter of the screw hole at the inner end is smaller than the diameter of the screw hole at the outer end. The center of the positioning seat is a perforation. The positioning seat has an external thread and a protruding shaft is disposed at an upper end thereof. A leakage proof ring is embedded in the outer wall of the protruding shaft. The positioning seat can be screwed into the two-stage screw hole of the first outlet passage of the outlet pipe, and the protruding shaft is inserted into the outlet end of the water outlet of the outlet hose to fix a position of the water outlet of the outlet hose.

A bubbler is disposed in the faucet device. The bubbler is provided with an external thread that can be screwed into the two-stage screw hole of the first outlet passage of the outlet pipe and closely fits the lower end of the positioning seat.

The metal joint of the outlet hose is provided with a recess which is located outside the neck portion. The movement of the metal joint can be controlled by inserting a tool having a U-shaped head into the recess.

One outer wall of the water flow guide is provided with a groove to embed a leak proof ring for preventing leakage.

DETAILED DESCRIPTION OF THE PREFERRED EMBODIMENT

Figure 1:
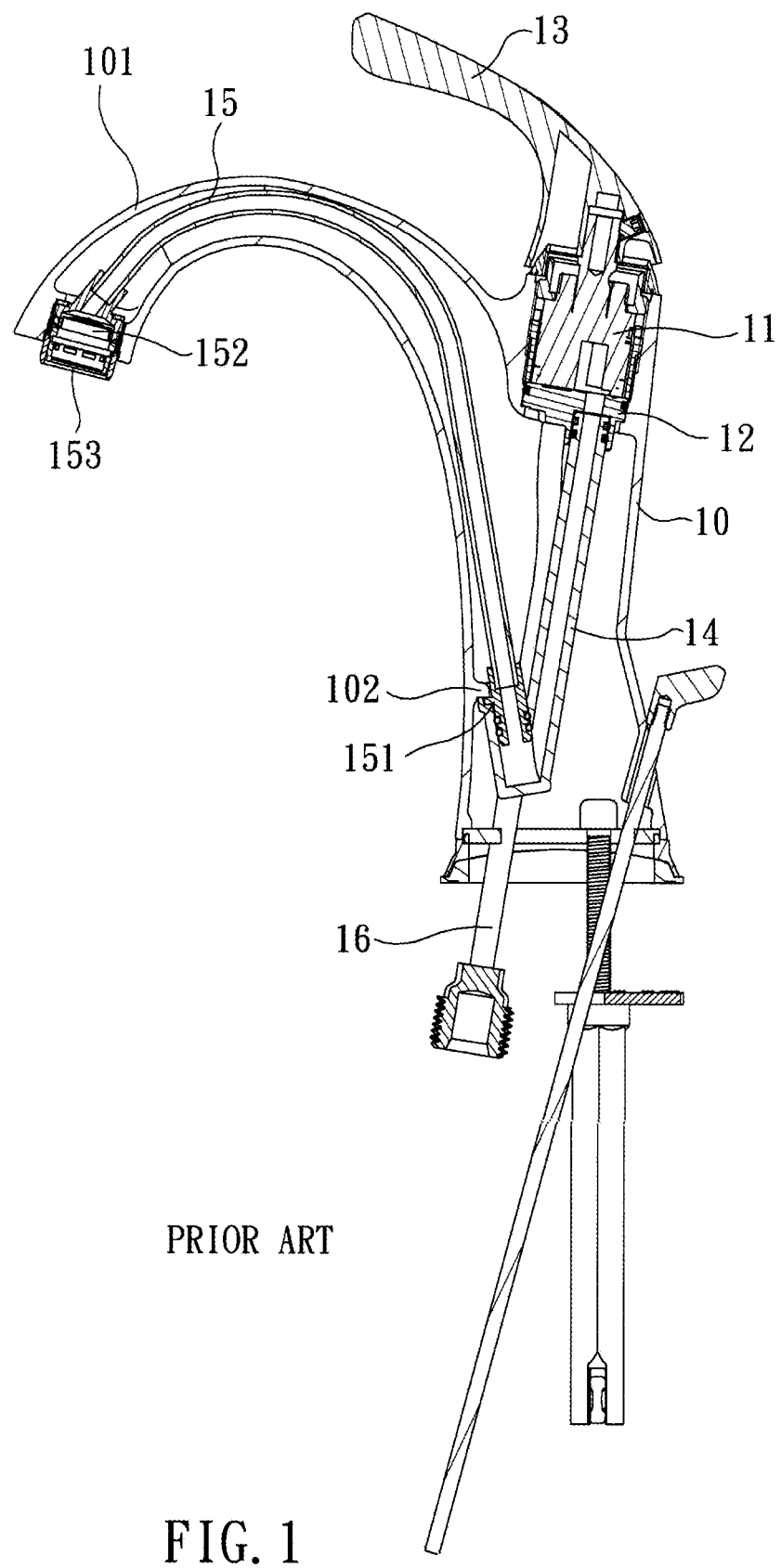
FIG. 1 shows the structure of a conventional faucet device.
Figure 2:
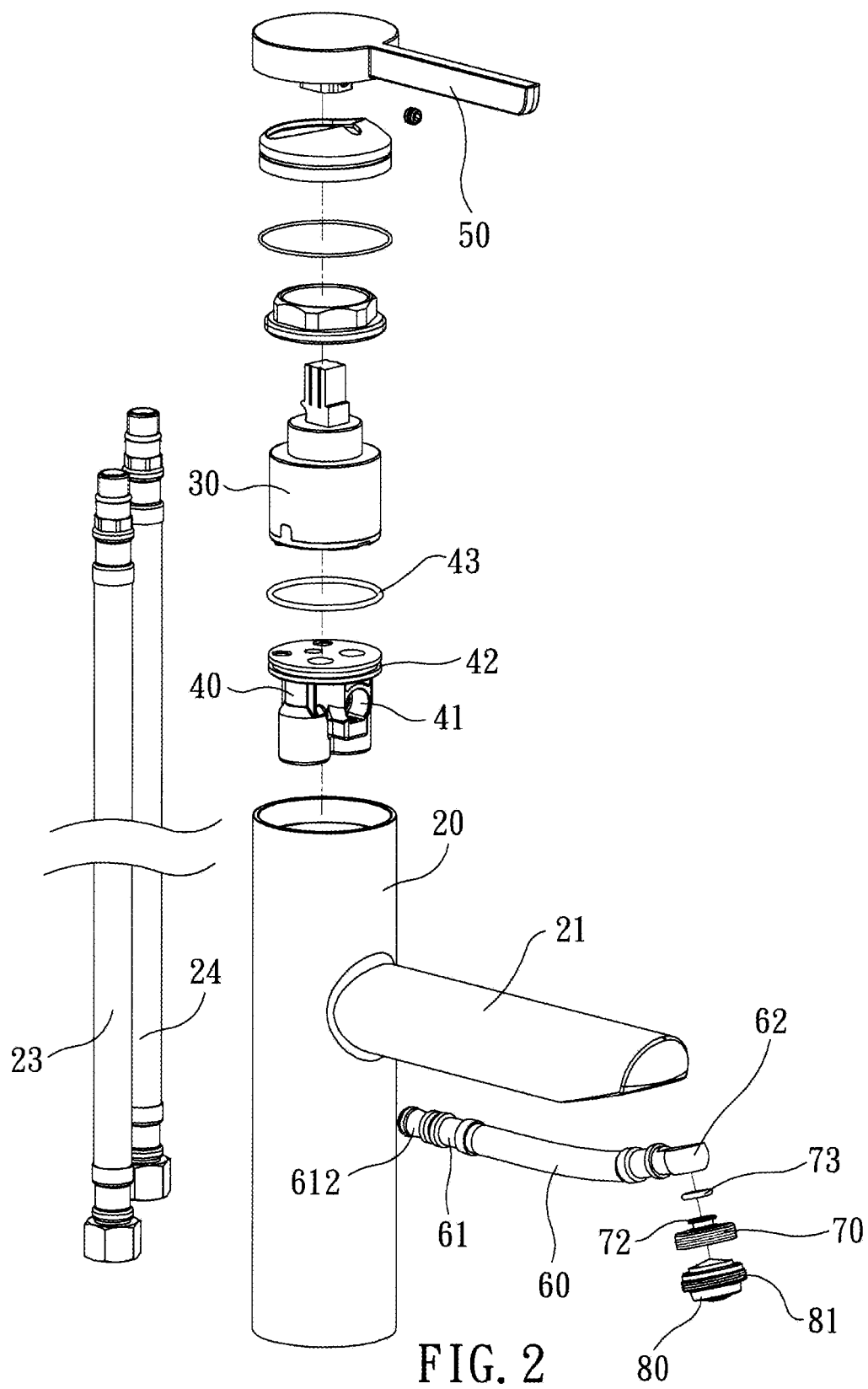
FIG. 2 is an exploded view of an embodiment of the present invention.
Figures 3, 4, 5:
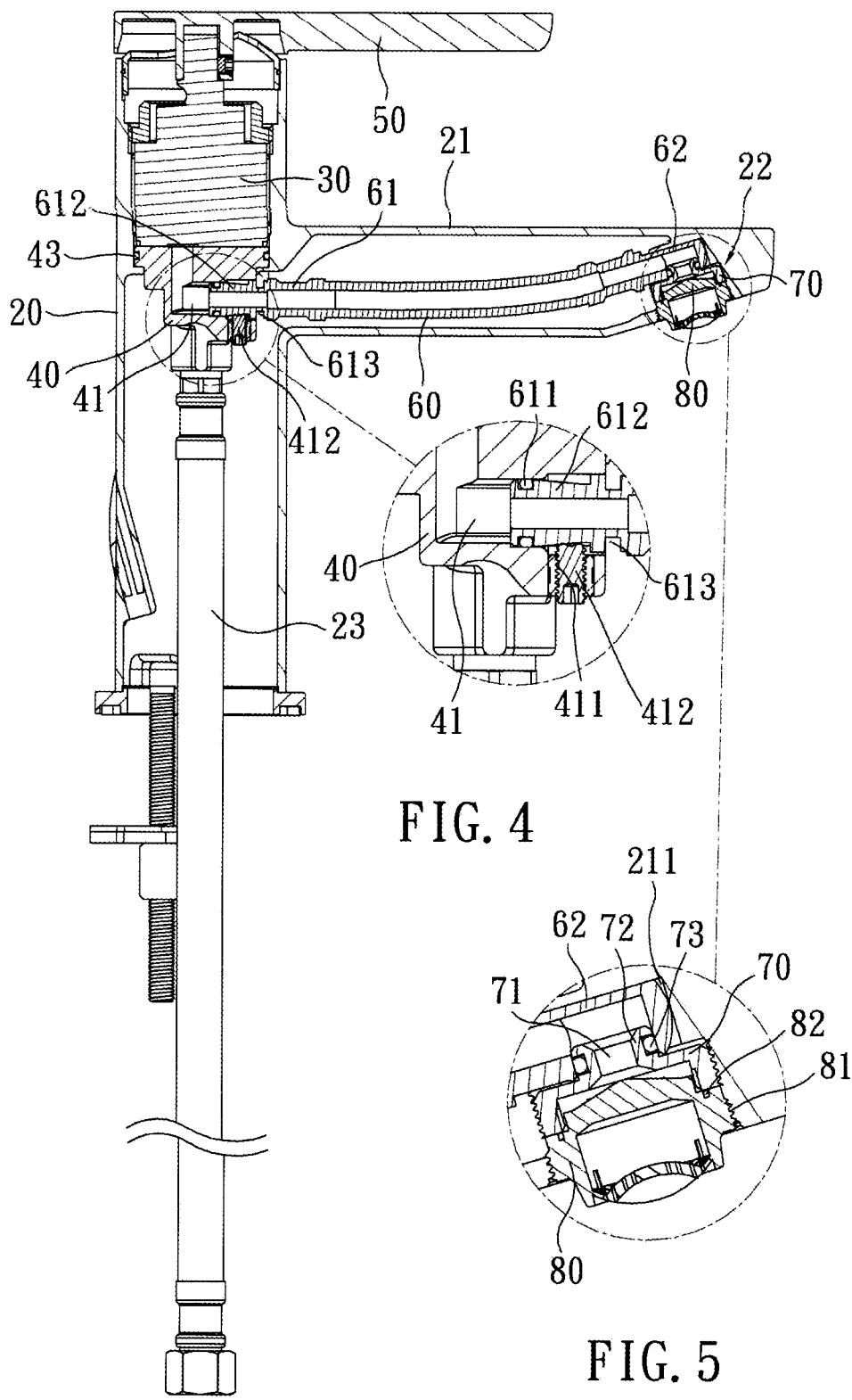
FIG. 3 is a cross-sectional view of the embodiment shown in FIG. 2.
FIG. 4 is a partial enlarged view of FIG. 3.
FIG. 5 is another partial enlarged view of FIG. 3.

Please refer to FIG. 2 to FIG. 5. The faucet device disclosed in the present invention comprises: a body 20, a water temperature regulating valve 30, a water flow guide 40, a control rod 50, an outlet hose 60, and a positioning seat 70. The body 20 is provided with an outlet pipe 21, and a first outlet passage 22 is disposed below the outlet pipe 21. The water temperature regulating valve 30 and the water flow guide 40 are disposed in the body 20. The water temperature can be adjusted and the water can be controlled by operating the control rod 50. The water flow guide 40 is disposed at a lower end of the water temperature regulating valve 30. A hot water pipe 23 and a cold water pipe 24 are introduced into the water temperature regulating valve 30 via the water flow guide 40. The warm water or cold water flowing out of the water temperature regulating valve 30 can flow out from a second outlet passage 41 of the water flow guide 40.

The outlet hose 60 is concealed in the outlet pipe 21 of the body 20 as a water passage of warm water or cold water. Please refer to FIG. 6, the inner end of the outlet hose 60 is fixed with a metal joint 61 and the outer end is a water outlet 62. A first leakage proof ring 611 is embedded in the outer wall of the inner end of the metal joint 61. The metal joint 61 is provided with a neck portion 612 whose outer diameter is tapered from the inside to the outside. The neck portion 612 is located outside the first leakage proof ring 611. The inner end of the metal joint 61 can be inserted into the second outlet passage 41 of the water flow guide 40, and the first leakage proof ring 611 is provided to prevent leakage. One sidewall of the second outlet passage 41 is provided with a radially extending screw hole 411. And, a screw 412 is screwed into the screw hole 411 and urges the neck portion 612 of the metal joint 61 to prevent the metal joint 61 from coming out of the second outlet passage 41. Due to the tapered shape of the neck portion 612, it is ensured that the metal joint 61 does not come out of the second outlet passage 41. The water outlet 62 of the outlet hose 60 is provided with an outlet end 621. The water that has flowed out of the water flow guide 40 flows out through the outlet end 621 through the passage of the outlet hose 60.

The first outlet passage 22 of the outlet pipe 21 of the body 20 is a two-stage screw hole, and the diameter of the screw hole at the inner end is smaller than the diameter of the screw hole at the outer end. A flat groove 211 is disposed in the outlet pipe 21, and the flat groove 211 is located above the first outlet passage 22. The water outlet 62 of the outlet hose 60 is inserted into the flat groove 211 just in unison. The center of the positioning seat 70 is a perforation 71. The positioning seat 70 has an external thread, and a protruding shaft 72 is disposed at an upper end thereof. A second leakage proof ring 73 is embedded in the outer wall of the protruding shaft 72. The positioning seat 70 can be screwed into the two-stage screw hole of the first outlet passage 22 of the outlet pipe 21, and the protruding shaft 72 is inserted into the outlet end 621 of the water outlet 62 of the outlet hose 60 to fix a position of the water outlet 62 of the outlet hose 60. At the same time, the second leakage proof ring 73 achieves the purpose of preventing leakage. Therefore, the water flowing out of the water outlet 62 of the outlet hose 60 flows out of the body 20 through the perforation 71 of the positioning seat 70.

Figure 7:
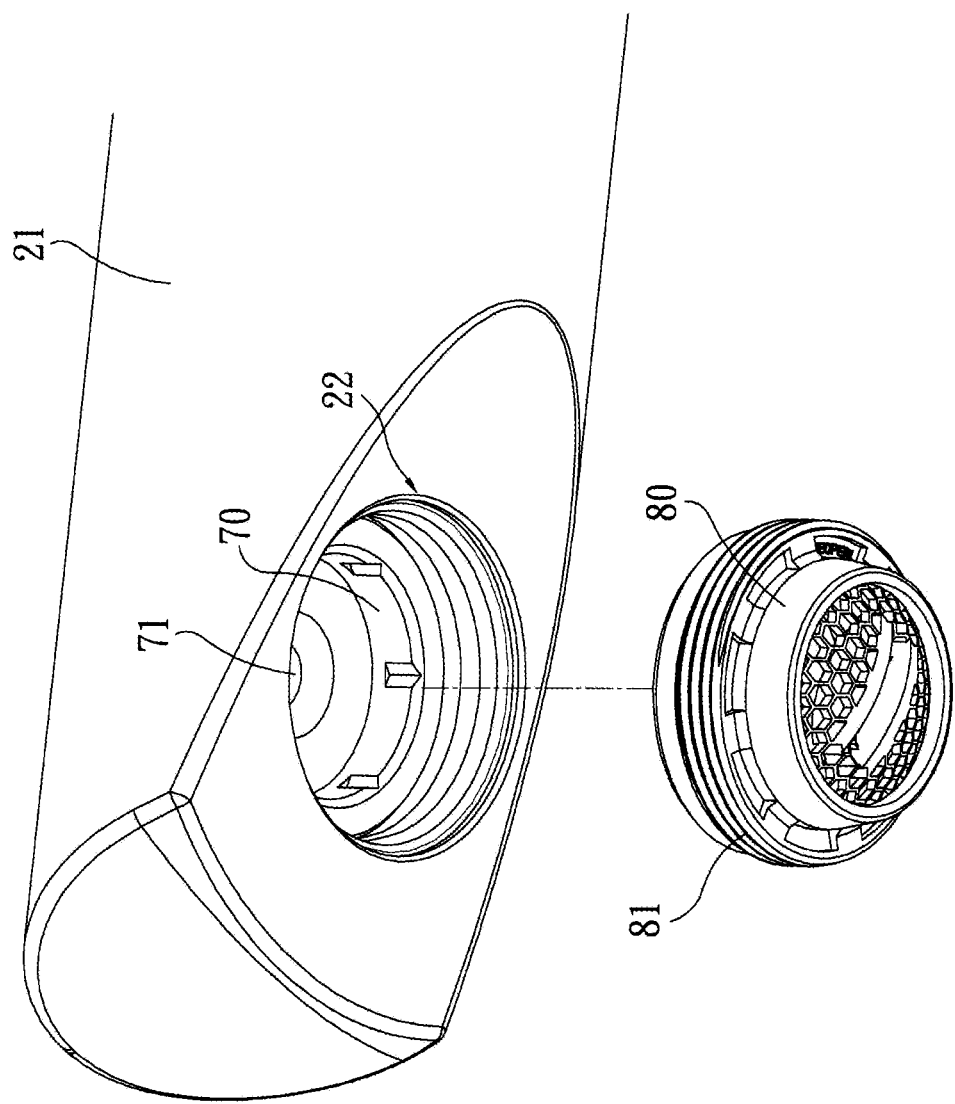
FIG. 7 is an exploded view of the bubbler and the body.

Please refer to FIG. 7, a bubbler 80 can be screwed into the first outlet passage 22 of the outlet pipe 21 of the body 20. The bubbler 80 is provided with an external thread 81 that can be screwed into the two-stage screw hole of the first outlet passage 22 of the outlet pipe 21 and closely fits the lower end of the positioning seat 70. A leakage preventing gasket 82 can be disposed between the bubbler 80 and the positioning seat 70, so that water flowing out of the positioning seat 70 must flow out through the bubbler 80. Since the attachment of the bubbler 80 is fixed in a peripherally restrained manner, it is not easy to cause an angular shift after installation.

Figure 8:
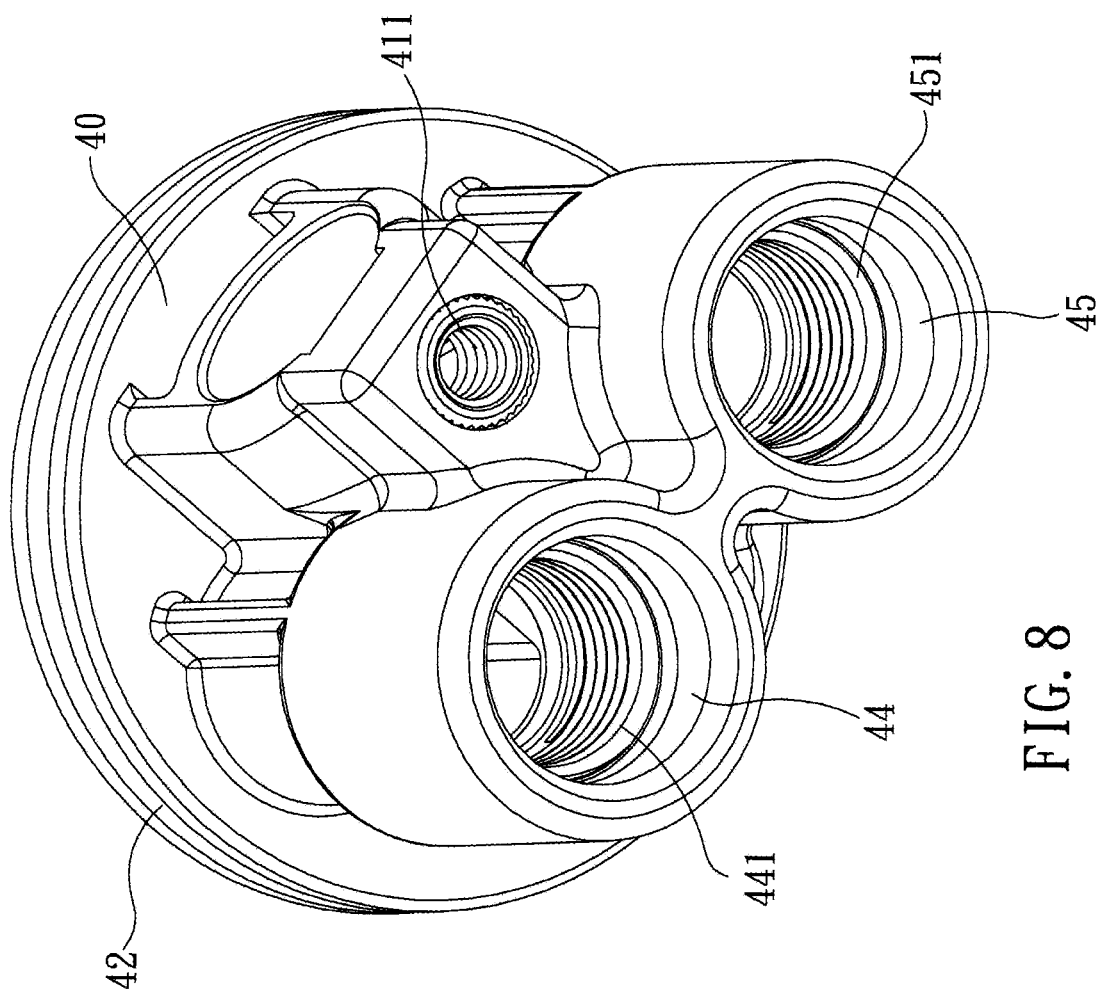
FIG. 8 is an external view of the water flow guide at another angle.

Please refer to FIG. 8, the outer wall of the water flow guide 40 is provided with a groove 42 for embedding a third leakage proof ring 43. When the water temperature regulating valve 30 above the water flow guiding seat 40 is slightly damaged and the water is oozing out, the third leakage proof ring 43 can prevent the water droplets from dripping out of the body 20 downward. The water flow guide 40 is provided with a joint 44 and a joint 45 of the hot water pipe 23 and the cold water pipe 24. A screw copper piece 441 is arranged in the joint 44, and a screw copper piece 451 is arranged in the joint 45. Another screw copper piece is arranged in the radially extending screw hole 411. The screw copper piece 441 and 451 can increase the strength of the joints 44 and 45, respectively. The screw copper piece in the radially extending screw hole 411 is to avoid damage or tooth removal of the radially extending screw hole 411.

Figure 6:
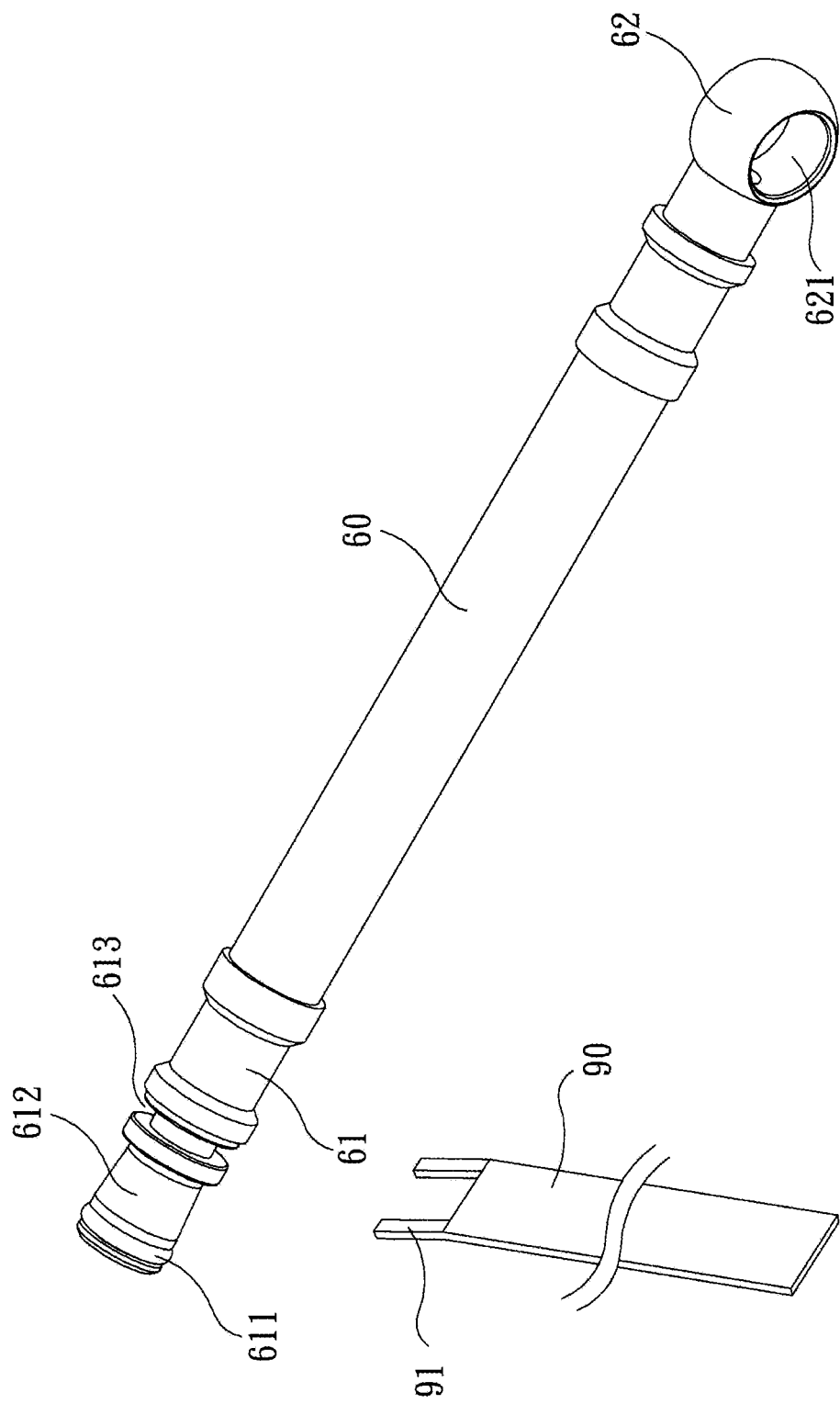
FIG. 6 is an external view of the outlet hose.

Please refer to FIG. 6, the metal joint 61 of the outlet hose 60 is provided with a recess 613 which is located outside the neck portion 612. A person can use an elongated rod 90 having a U-shaped head 91 and insert the U-shaped head 91 into the recess 613 to control the metal joint 61. That is, the metal joint 61 is forcibly inserted into the second outlet passage 41 of the water flow guide 40 by the elongated rod 90. When the inner side wall of the recess 613 is aligned with the edge of the second outlet passage 41, the metal joint 61 is inserted into the positioning.

In summary, the faucet device provided by the present invention has a simple and accurate assembly method of the outlet hose 60, and is advantageous for replacing the outlet hose 60 in the future. In the present invention, a third leakage proof ring 43 is provided on the water flow guide 40, so that the water droplets can be prevented from dripping on the floor when the water temperature regulating valve 30 leaks.

The above description uses the preferred embodiments to illustrate the present invention and not to limit the scope of the present invention. Those who are familiar with such art can understand, make minor changes and adjustments, and still do not lose the essence of this creation, and do not deviate from the spirit and scope of this creation.

What is claimed is:

1. A faucet device comprises:
   a body, having an outlet pipe with a first outlet passage disposed below the outlet pipe;
   a water temperature regulating valve and a water flow guide, disposed in the body, wherein the water flow guide is disposed at a lower end of the water temperature regulating valve;
   a cold water pipe and a hot water pipe, introduced into the water temperature regulating valve via the water flow guide;
   a second outlet passage, disposed in the water flow guide, wherein water flowing out of the water temperature regulating valve can flow out from the second outlet passage;
   an outlet hose, concealed in the outlet pipe of the body;
   characterized in that a metal joint, fixed with an inner end of the outlet hose, wherein the metal joint can be inserted into the second outlet passage;
   a first leakage proof ring, embedded in an outer wall of the inner end of the metal joint;
   a neck portion, disposed on the metal joint and located outside the first leakage proof ring, wherein an outer diameter of the neck portion is tapered from the inside to the outside;
   a radially extending screw hole, disposed in one sidewall of the second outlet passage, wherein a screw is screwed into the radially extending screw hole and urges the neck portion to fix the metal joint;
   a water outlet with an outlet end, disposed on one end of the outlet hose;
   a two-stage screw hole, located on the first outlet passage, wherein a diameter of the two-stage screw hole at the inner end is smaller than the diameter of the two-stage screw hole at the outer end;
a positioning seat, having a perforation with an external thread and a protruding shaft disposed at an upper end of the positioning seat; and
a second leakage proof ring, embedded in an outside of the protruding shaft, wherein the positioning seat can be screwed into the two-stage screw hole of the first outlet passage, and the protruding shaft is inserted into the outlet end of the water outlet to fix a position of the water outlet of the outlet hose.

2. The faucet device as recited in claim 1, further comprising a bubbler provided with an external thread that can be screwed into the two-stage screw hole of the first outlet passage of the outlet pipe and closely fits the lower end of the positioning seat.

3. The faucet device as recited in claim 1, wherein the metal joint of the outlet hose is provided with a recess which is located outside the neck portion.

4. The faucet device as recited in claim 1, wherein outside of the water flow guide is provided with a groove for embedding a third leakage proof ring.

\* \* \* \* \*